(12) United States Patent
Higuchi

(10) Patent No.: US 12,041,356 B2
(45) Date of Patent: Jul. 16, 2024

(54) IMAGING DEVICE, IMAGING SYSTEM, CONTROL METHOD, PROGRAM, AND STORAGE MEDIUM

(71) Applicant: CANON KABUSHIKI KAISHA, Tokyo (JP)

(72) Inventor: Shintaro Higuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/180,993

(22) Filed: Mar. 9, 2023

(65) Prior Publication Data

US 2023/0209203 A1 Jun. 29, 2023

Related U.S. Application Data

(63) Continuation of application No. 17/174,440, filed on Feb. 12, 2021, now Pat. No. 11,627,258.

(30) Foreign Application Priority Data

Feb. 25, 2020 (JP) .................. 2020-029714

(51) Int. Cl.
*H04N 23/69* (2023.01)
(52) U.S. Cl.
CPC ................. *H04N 23/69* (2023.01)
(58) Field of Classification Search
CPC ...... H04N 23/69; H04N 7/181; H04N 23/661; H04N 23/695; H04N 23/698; H04N 23/90; H04N 7/18; H04N 23/67; H04N 23/62; H04N 23/632
See application file for complete search history.

(56) References Cited

U.S. PATENT DOCUMENTS

| 7,012,637 | B1 * | 3/2006 | Blume | H04N 23/90 348/E7.086 |
| 8,319,865 | B2 * | 11/2012 | Lee | H04N 23/611 348/265 |
| 11,206,352 | B2 | 12/2021 | Wang et al. | |

(Continued)

FOREIGN PATENT DOCUMENTS

| JP | 2005286452 A | 10/2005 |
| JP | 2006041611 A | 2/2006 |

OTHER PUBLICATIONS

Office Action issued in U.S. Appl. No. 17/174,440 mailed Aug. 9, 2022.

(Continued)

*Primary Examiner* — Chiawei Chen
(74) *Attorney, Agent, or Firm* — ROSSI, KIMMS & McDOWELL LLP

(57) ABSTRACT

An imaging device includes a plurality of imaging units, a control unit configured to control a zoom magnification of each of the imaging units, and an acquisition unit configured to acquire the zoom magnification of each of the imaging units. When the zoom magnification of one imaging unit among the plurality of imaging units is changed, the control unit changes the zoom magnification by interlocking the imaging unit whose zoom magnification is changed with at least one imaging unit other than the imaging unit whose zoom magnification is changed, and changes the two of the imaging units to have the same zoom magnification.

20 Claims, 6 Drawing Sheets

(56) References Cited

U.S. PATENT DOCUMENTS

| | | |
|---|---|---|
| 2002/0118969 A1 | 8/2002 | Kanade et al. |
| 2006/0017812 A1 | 1/2006 | Kogane |
| 2009/0295949 A1 | 12/2009 | Ojala |
| 2011/0187866 A1* | 8/2011 | Lee .......................... H04N 7/18 |
| | | 348/E7.085 |
| 2013/0093842 A1 | 4/2013 | Yahata |
| 2013/0335520 A1 | 12/2013 | Campbell et al. |
| 2014/0118480 A1 | 5/2014 | Rimai et al. |
| 2014/0118757 A1 | 5/2014 | Rimai et al. |
| 2014/0132741 A1* | 5/2014 | Aagaard .............. H04N 17/002 |
| | | 348/48 |
| 2019/0068892 A1* | 2/2019 | Yasutake ................ H04N 23/55 |

OTHER PUBLICATIONS

Notice of Allowance issued in U.S. Appl. No. 17/174,440 mailed Dec. 13, 2022.

\* cited by examiner

IMAGING DEVICE, IMAGING SYSTEM, CONTROL METHOD, PROGRAM, AND STORAGE MEDIUM

BACKGROUND OF THE INVENTION

Field of the Invention

The present invention relates to an imaging device, an imaging system, a control method, a program, and a storage medium.

Description of the Related Art

In recent years, network cameras have been used for the purpose of street crime prevention and monitoring of stores, buildings, or factories. Some network cameras not only have a lens barrel unit formed integrally with the camera body, but also have a mechanism that allows the lens barrel unit to pan, tilt, and zoom. In network cameras provided with such a lens barrel unit capable of panning, tilting, and zooming, a wide range of regions can be checked with one network camera.

There is a multi-lens network camera having two or more lens barrel units mounted in one network camera. Since this one network camera can realize a wide range of flexible monitoring, it is becoming widespread due to its excellent cost effectiveness. In addition, a multi-lens network camera in which each of a plurality of lens barrel units can be electrically operated has also been put on the market, and the operation of each lens barrel unit by remote control makes it possible to perform more flexible monitoring.

In a multi-lens network camera that can be electrically operated, in a case where a positional relationship of pan, tilt, and zoom between imaging units adjacent to each other is important in adjusting the imaging direction and the imaging angle of view of each lens barrel unit, controlling the adjustment between the imaging units adjacent to each other for each imaging unit takes time and effort. As a result, there is a problem in that the installability of a network camera deteriorates. For example, a case in which one panoramic image is desired to be captured using two lens barrel units can be considered. A case in which, with the positions of two lens barrel units for pan, tilt, and zoom aligned in capturing a panoramic image, the imaging range is adjusted can be considered. In an operation of the related art, the imaging range of one lens barrel unit is first changed. Next, the imaging range of the other lens barrel unit is changed to have the same amount of movement as one lens barrel unit. However, if the amount of movement for adjusting the imaging range of the other lens barrel unit does not coincide with the amount of movement of one lens barrel unit, fine adjustment is further required for alignment, and it is necessary to perform alignment between the lens barrel units again.

As means for adjusting the angles of field of a plurality of cameras, there is a technique disclosed in Japanese Patent Laid-Open No. 2006-41611. In the technique disclosed in Japanese Patent Laid-Open No. 2006-41611, a slave camera operates to follow the position of a subject and the operation of a master camera with respect to the master camera. In addition, Japanese Patent Laid-Open No. 2005-286452 discloses a method of performing a zoom process and a pan operation so that a viewing angle or more designated by a user can be captured when images are captured with a plurality of cameras.

As a means for adjusting the angles of field of a plurality of cameras, in the technique disclosed in Japanese Patent Laid-Open No. 2006-41611 described above, the imaging angle of view of the slave camera is determined according to a positional relationship between the master camera and the subject, and thus the imaging angles of view of the master camera and the slave camera are not necessarily achieved as desired by a user. In addition, in the technique disclosed in Japanese Patent Laid-Open No. 2005-286452 described above, imaging units located on both ends of an imaging unit serving as a reference perform pan movement in the case of a viewing angle or more designated by a user, but a positional relationship between the imaging units after zoom and pan movement is not necessarily achieved as desired by the user.

SUMMARY OF THE INVENTION

The present provides a control method and a control unit that make it easy to adjust the imaging ranges of a plurality of imaging units in an imaging device including the plurality of imaging units.

The present invention includes a plurality of imaging units, a control unit configured to control a zoom magnification of each of the imaging units, and an acquisition unit configured to acquire the zoom magnification of each of the imaging units, and when the zoom magnification of one imaging unit among the plurality of imaging units is changed, the control unit changes the zoom magnification by interlocking the imaging unit whose zoom magnification is changed with at least one imaging unit other than the imaging unit whose zoom magnification is changed, and changes the two of the imaging units to have the same zoom magnification.

Further features of the present invention will become apparent from the following description of exemplary embodiments with reference to the attached drawings.

DESCRIPTION OF THE EMBODIMENTS

Hereinafter, a form (embodiment) for carrying out the present invention will be described with reference to the accompanying drawings.

Embodiment

Figure 1:
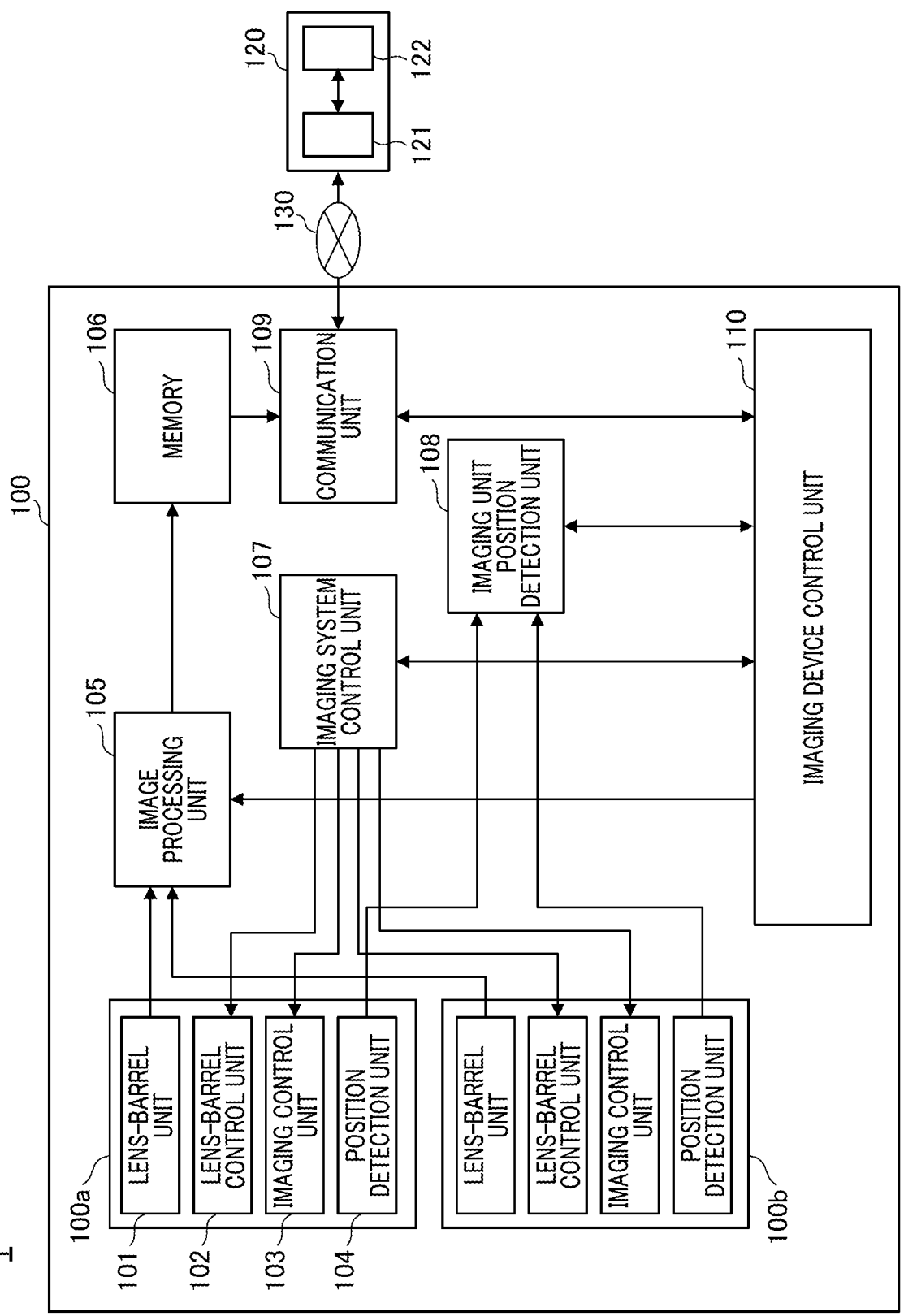
FIG. 1 is a block diagram illustrating an example of an imaging system including an imaging device according to an embodiment.

First, an embodiment of the present invention will be described. FIG. 1 is a block diagram illustrating an example of an imaging system 1 including an imaging device 100 according to an embodiment of the present invention. The imaging system 1 includes the imaging device 100 and an information processing device 120. The imaging device 100 includes an imaging unit 100a, an imaging unit 100b, a lens-barrel unit 101, a lens-barrel control unit 102, an imaging control unit 103, a position detection unit 104, and an image processing unit 105. The imaging device 100 further includes a memory 106, an imaging system control unit 107, an imaging unit position detection unit 108, a communication unit 109, and an imaging device control unit 110. The imaging device 100 is communicably connected to the information processing device 120 through a network 130.

The imaging unit 100a is configured to include the lens-barrel unit 101, the lens-barrel control unit 102, the imaging control unit 103, and the position detection unit 104. The lens-barrel unit 101 is configured to include a plurality of lenses, a aperture, an optical filter such as an infrared cut filter, and a photoelectric conversion element such as a CCD (Charge Coupled Device) or a CMOS (Complementary Metal Oxide Semiconductor). The lens-barrel control unit 102 performs imaging control such as focusing control, zoom control, and/or exposure control on the imaging unit 100a on the basis of a control signal to be input. The imaging control unit 103 controls the imaging direction of the imaging unit 100a relative to its shift movement, tilt, and/or pan. The position detection unit 104 has a unit configured to acquire the position in a shift direction, the amount of tilt, the amount of pan, and/or the zoom magnification of the lens-barrel unit 101. The position in a shift direction referred to here indicates the positions of imaging units 100a, 100b, and 100c on a rail 200. In addition, the amount of pan indicates an angle at which the imaging units 100a, 100b, and 100c move horizontally from a reference position at a fixed position on the rail 200. In addition, the amount of tilt indicates an angle at which the imaging units 100a, 100b, and 100c move vertically from the reference position at the fixed position on the rail 200. The imaging unit 100b is configured to include the same elements as the imaging unit 100a.

Figure 2:
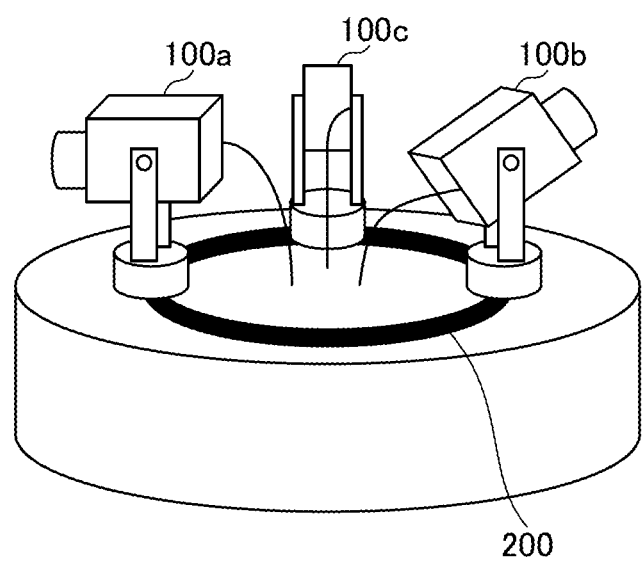
FIG. 2 is a schematic diagram illustrating an outward appearance of the imaging device.

FIG. 2 is a schematic diagram illustrating an outward appearance of the imaging device 100. The imaging device 100 is configured such that the imaging unit 100a, the imaging unit 100b, and the imaging unit 100c move on the rail 200. Here, the rail 200 has an annular shape as an example, but is not limited thereto and may have other shapes such as a rectangle. The imaging unit 100c has the same function as the imaging unit 100a and the imaging unit 100b. Each of the imaging units is connected to a substrate inside the device through a wire harness constituted by a thin-wire coaxial cable or the like, and transmits and receives various signals. In the present specification, an operation in which the imaging unit moves on the rail is defined as shift movement, and the imaging unit operating right or left (horizontally) without moving on the rail is defined as pan. The imaging unit operating up and down (vertically) without moving on the rail is defined as tilt. Meanwhile, the imaging device of FIG. 2 is configured to have three imaging units, but may have four or more imaging units or may have two imaging units in accordance with the size of the imaging device.

Referring back to FIG. 1, the image processing unit 105 performs predetermined image processing (for example, a color balance adjustment process and/or a gamma correction process) on an image generated by the lens-barrel unit 101, and then outputs the result to the memory 106. In this case, the image processing unit 105 outputs an image file or a moving image file of a predetermined format such as JPEG, H.264, or H.265 to the memory 106.

The imaging system control unit 107 generates and outputs a signal for controlling the lens-barrel control unit 102 and the imaging control unit 103 which are included in each imaging unit on the basis of a signal to be input.

The imaging unit position detection unit 108 reads out and temporarily stores the position (shift position) on the rail, the amount of pan, the amount of tilt, and/or the zoom magnification of each imaging unit from the position detection unit 104 in order to acquire the imaging direction or imaging range of each imaging unit.

The communication unit 109 transmits an image file or a moving image file stored in a memory to an information device (the information processing device 120) such as a server or a personal computer, a smartphone, or a tablet PC. The communication unit 109 provides a user interface to a display unit 121 of the information processing device 120 in order to receive control information from the information processing device 120, and receives processing details according to an operation from the information processing device 120. The communication unit 109 can also have a form of transmitting both an image file or a moving image file stored in a memory and a user interface to the information processing device 120.

The imaging device control unit 110 includes a CPU (computer) and a memory (a ROM or a RAM), and the CPU performs overall control of each component of the imaging device 100 in accordance with a computer program loaded from the memory. Specifically, the imaging device control unit 110 transmits and receives, for example, a signal to and from the image processing unit 105, the imaging system control unit 107, the imaging unit position detection unit 108, and the communication unit 109. The imaging device control unit 110 transmits details of image processing to be actually executed to the image processing unit 105. The imaging device control unit 110 transmits processing details of a user's operation of a user interface to the imaging system control unit 107, and sends a control signal for zooming, shifting, tilting, and/or panning each imaging unit. The imaging device control unit 110 reads out (acquires) the position on the rail or the amount of pan and/or tilt of each imaging unit from the imaging unit position detection unit 108 in order to acquire the imaging position of the imaging unit. In addition, the imaging device control unit 110 reads out (acquires) the zoom magnification of the imaging unit from the imaging unit position detection unit 108.

Meanwhile, the imaging device 100 of FIG. 1 is configured to have two imaging units, but it may have three or more imaging units in accordance with the size of the imaging device.

Figure 3:
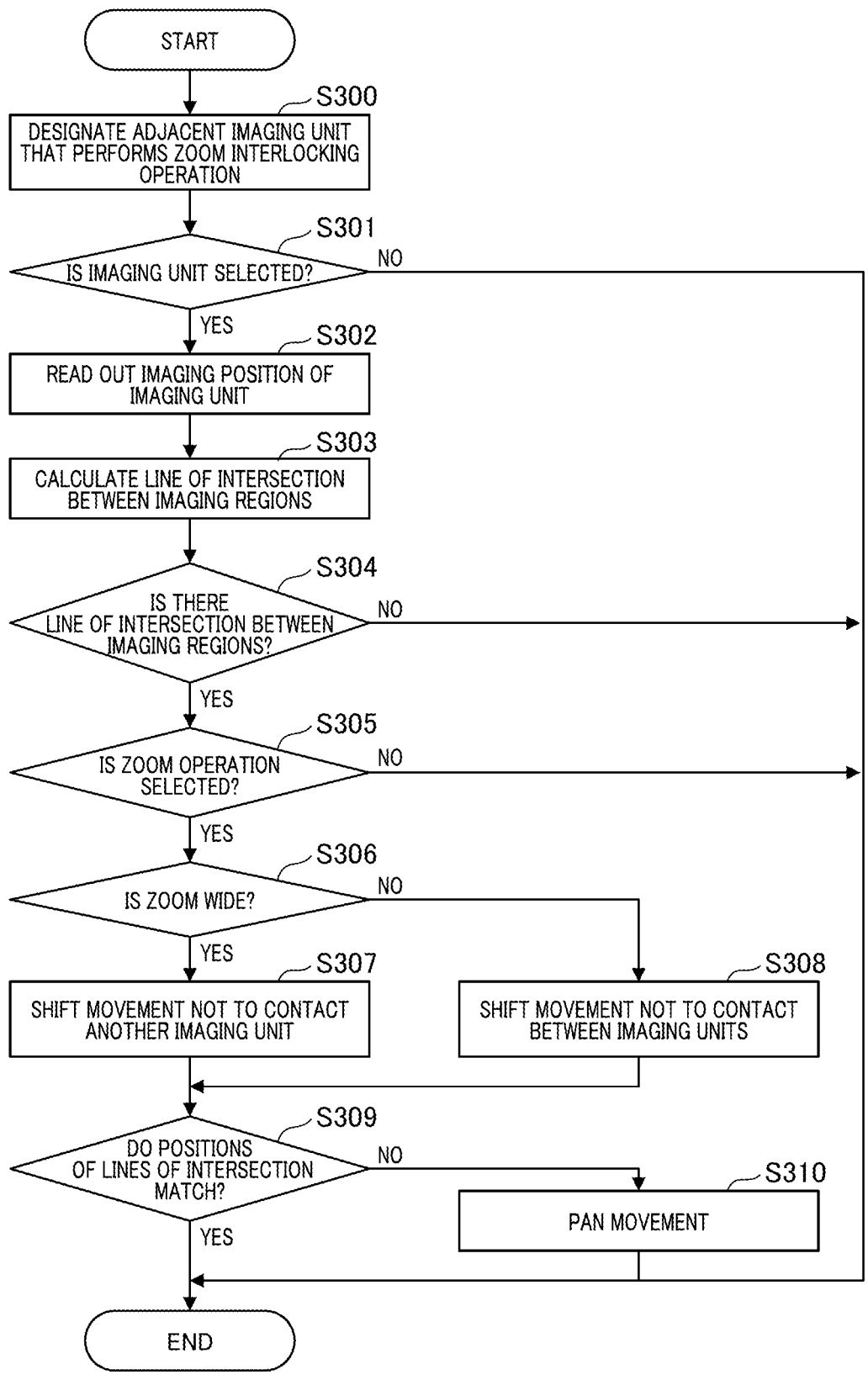
FIG. 3 is a flow chart illustrating an example of a processing procedure according to an embodiment.

FIG. 3 is a flow chart illustrating an example of a processing procedure according to an embodiment of the present invention. Each operation (step) shown in this flow chart can be executed by the imaging device control unit 110 controlling each unit. Meanwhile, the flow chart of FIG. 3 shown below will be described with reference to the diagram illustrating the imaging device shown in FIG. 1 and a diagram illustrating a display screen of a user interface in FIG. 4.

In step S300, the imaging device control unit 110 reads out information as to whether a zoom interlocking operation between the imaging units is selected which is input from the communication unit 109 through a user interface. A user selects an imaging unit adjacent to an imaging unit which is a target for operation, for example, using an input unit such as a mouse or a touch panel from the user interface of FIG. 4 through the information processing device 120, and selects whether the zoom interlocking operation is performed between the imaging units. The imaging unit which is a target for operation referred to here is an imaging unit in which the user performs a zoom change operation. In addition, in an operation for changing a zoom magnification, the zoom magnification of an imaging unit that performs the zoom interlocking operation is changed to the same magnification as that of the imaging unit which is a target for operation. However, there may be some errors. That is, in the present specification, the term "same" also includes a case in which there are some errors.

Figure 4:
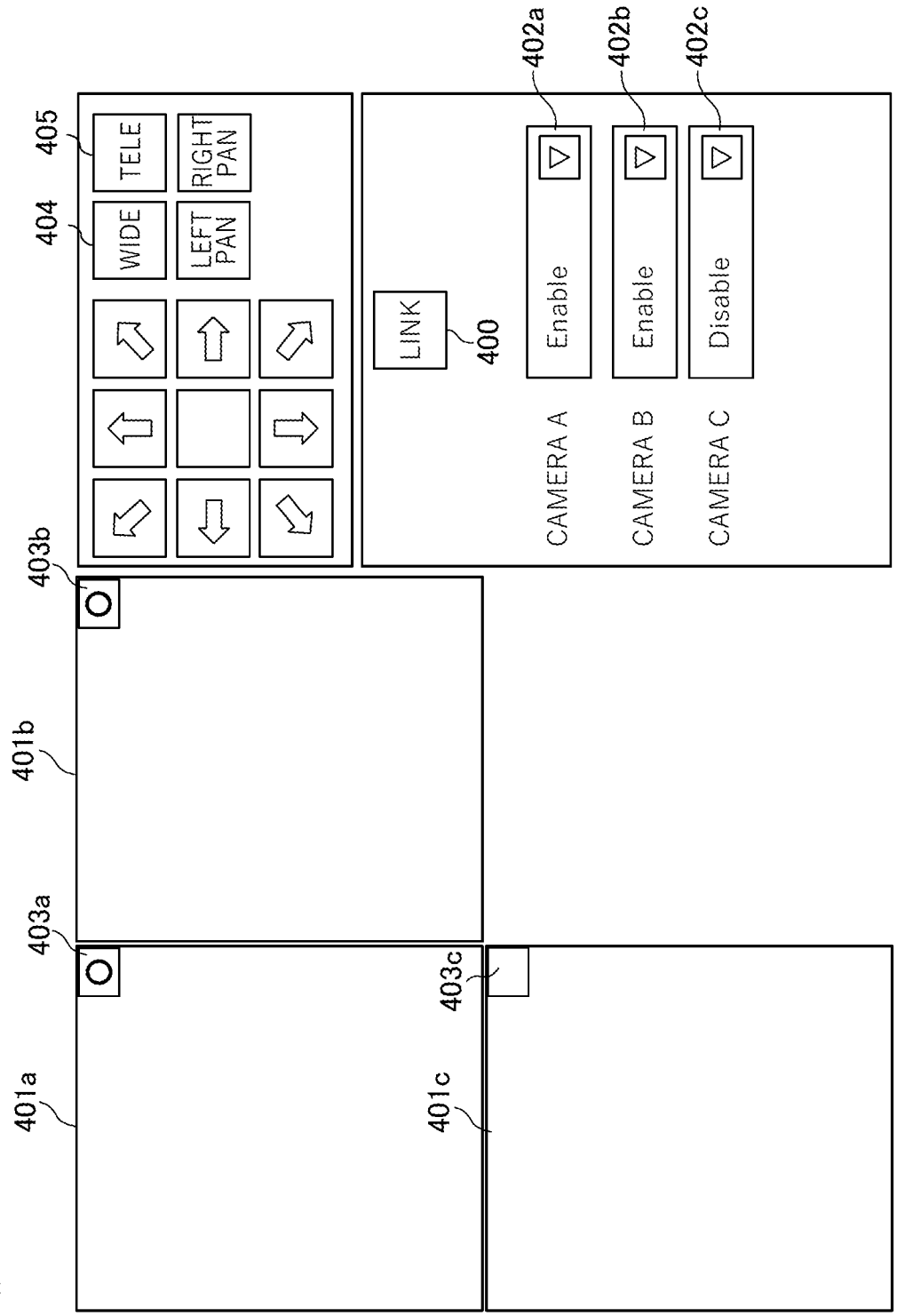
FIG. 4 is a diagram illustrating a display screen of a user interface.

The user first presses a button 400 that is a button for performing the zoom interlocking operation between the imaging units as shown in FIG. 4. The user selects an imaging unit that is adjacent to the imaging unit which is a target for operation and that performs the zoom interlocking operation. As for a method of selecting an imaging unit that performs the zoom interlocking operation from the user interface, for example, captured images (or videos) 401a, 401b, and 401c corresponding to imaging units are selected. Alternatively, there is a method such as selection from drop-down lists 402a, 402b, and 402c or selection from checkboxes 403a, 403b, and 403c appearing after the button 400 is pressed. If the user selects the images 401a, 401b, and 401c, for example, a process of temporarily changing the display color of the outer frame may be performed so that the selection can be visually recognized.

In step S301, the imaging device control unit 110 confirms whether the user has selected an imaging unit that performs the zoom interlocking operation within a certain period of time after the button 400 is pressed on the basis of information which is received by the communication unit 109.

If the imaging device control unit 110 determines that the user has selected an imaging unit that performs the zoom interlocking operation, from the information which is received by the communication unit 109, in step S301 (S301/Yes), the imaging device control unit 110 proceeds to step S302.

In step S302, the imaging device control unit 110 controls the imaging unit position detection unit 108 to read out information relating to the position on the rail 200 and the amount of pan of each imaging unit, that is, an imaging unit that performs an interlocking operation with an imaging unit which is a target for operation. In addition, the imaging device control unit 110 reads out the zoom magnification of an imaging unit that performs the zoom interlocking operation selected in step S300 from the imaging unit position detection unit 108.

On the other hand, if the imaging device control unit 110 determines that the user has not selected an imaging unit that performs the zoom interlocking operation within a certain period of time after the button 400 is pressed, from the information which is received by the communication unit 109, in step S301 (S301/No), the imaging device control unit 110 ends the process without operating the imaging unit.

In step S303, the imaging device control unit 110 calculates an imaging region of each imaging unit from the position on the rail 200, the amount of pan, and the zoom magnification of each imaging unit which are read out in step S302. The imaging device control unit 110 calculates the position of the line of intersection between the imaging regions of the imaging units from the calculated imaging region of each imaging unit. If the imaging device control unit 110 can calculate the position of the line of intersection between the imaging regions of the imaging units, it stores the calculated position of the line of intersection between the imaging regions.

Figure 5:
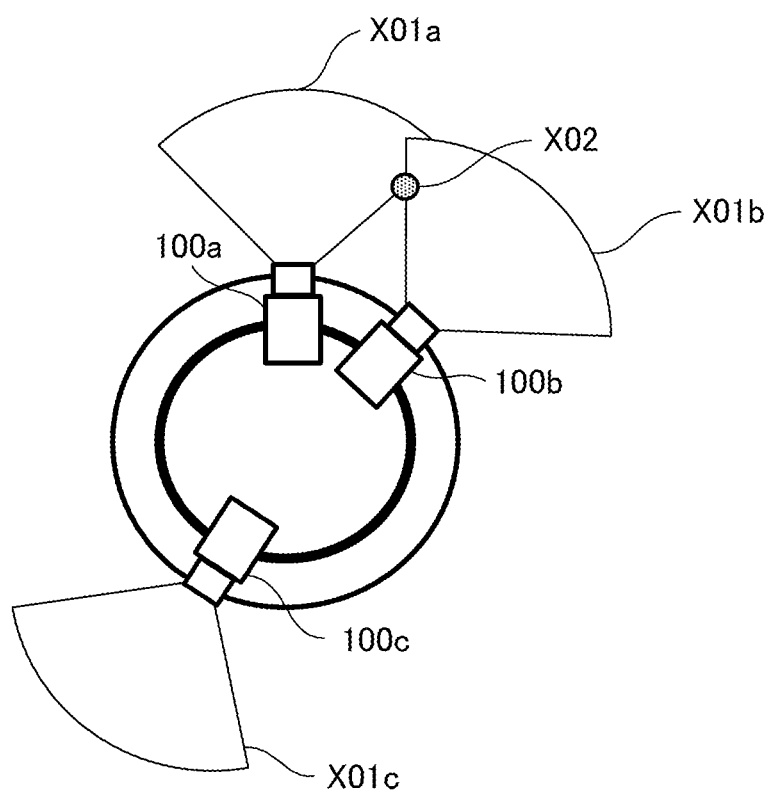
FIG. 5 is a diagram illustrating a process of calculating a position of a line of intersection between imaging regions.

Here, the process of step S303 will be described in detail with reference to FIG. 5. FIG. 5 is a diagram illustrating a process of calculating the position of the line of intersection between the imaging regions. The imaging device control unit 110 reads out the position on the rail, the amount of pan, and the zoom magnification of each imaging unit from the imaging unit position detection unit 108 of each of the imaging units 100a, 100b, and 100c. The imaging device control unit 110 calculates regions X01a, X01b, and X01c of which images are captured by the imaging units on the basis of the position on the rail, the amount of pan, and the zoom magnification of each of the imaging units 100a, 100b, and 100c. The imaging device control unit 110 calculates an overlapping portion between the imaging regions of the imaging units on the basis of the position on the rail and the amount of pan of each imaging unit and the calculated imaging regions X01a, X01b, and X01c, and calculates a line of intersection X02 between the imaging regions X01a and X01b. If the imaging device control unit 110 can calculate the position of the line of intersection between the imaging regions of the imaging units, it stores the position of the line of intersection between the imaging regions. In FIG. 5, the position of the line of intersection between the imaging regions to be stored is the line of intersection X02.

Referring back to FIG. 3, in step S304, the imaging device control unit 110 proceeds to step S305 if the position of the line of intersection between the imaging regions can be calculated in step S303 (S304/Yes).

In step S305, the imaging device control unit 110 confirms whether the user has pressed a button 404 or a button 405 shown in FIG. 4 and has selected the type of zoom of the imaging unit on the basis of the information which is received by the communication unit 109. The user selects the type of zoom from the user interface of FIG. 4 through the information processing device 120. The user selects the button 404 indicating wide movement or the button 405 indicating a tele movement.

In step S304, the imaging device control unit 110 ends the process without operating the imaging unit if the position of the line of intersection between the imaging regions cannot be calculated in step S303 (S304/No).

In step S305, the imaging device control unit 110 proceeds to step S306 if it is determined that the user has selected the type of zoom of the imaging unit from the information which is received by the communication unit 109 (S305/Yes).

In step S306, the imaging device control unit 110 confirms whether the zoom operation selected in step S305 is control to the wide side or control to the tele side.

In step S305, the imaging device control unit 110 ends the process without operating the imaging unit if it is determined that the user has not selected the type of zoom of the imaging unit within a certain period of time from the information which is received by the communication unit 109 (S305/No).

In step S306, the imaging device control unit 110 proceeds to step S307 if control to the wide side is selected as the type of zoom (S306/Yes).

In step S307, the imaging device control unit 110 sends a control signal of an operation of control to the wide side for the imaging unit designated in step S300 to the imaging system control unit 107. The imaging system control unit 107 controls the lens-barrel control unit 102 within the imaging unit which is a target, and performs an operation of control to the wide side. After the wide operation, the imaging device control unit 110 transmits a control signal for shift movement to the imaging system control unit 107 so that the imaging units are separated from each other in order to maintain the line of intersection between the imaging regions calculated in step S303.

In step S306, the imaging device control unit 110 proceeds to step S308 if control to the tele side is selected as the type of zoom (S306/No).

In step S308, the imaging device control unit 110 sends a control signal of an operation of control to the tele side for the imaging unit designated in step S300 to the imaging system control unit 107. The imaging system control unit 107 controls the lens-barrel control unit 102 within the imaging unit which is a target, and performs an operation of control to the tele side. After the operation of control to the tele side, the imaging device control unit 110 transmits a control signal for shift movement to the imaging system control unit 107 so that the imaging units approach each other in order to maintain the line of intersection between the imaging regions calculated in step S303.

Figure 6A:
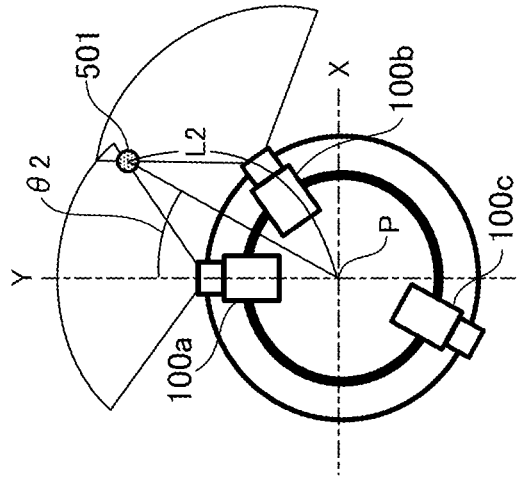
FIGS. 6A to 6E are diagrams illustrating shift operations in a zoom change process.
Figure 6B:
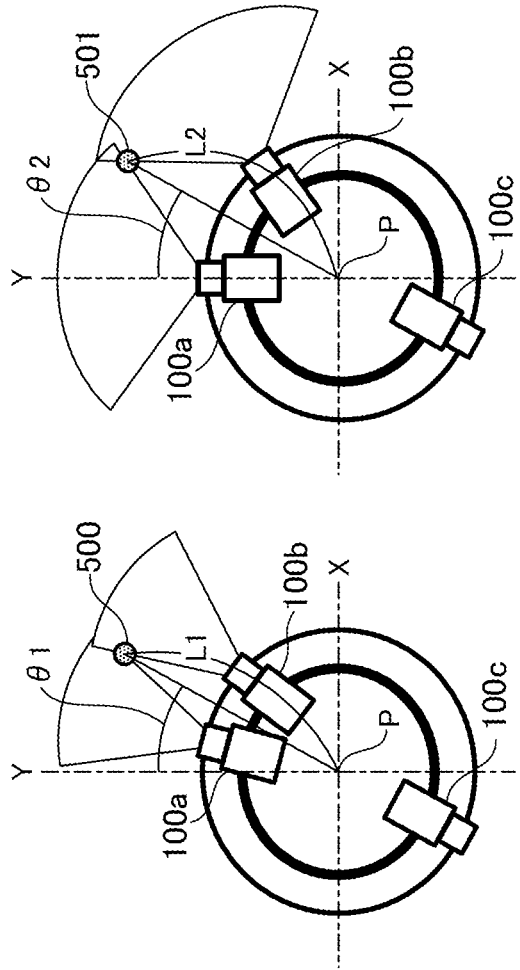

As an operation example, the operation of step S307 will be described with reference to FIG. 6. FIG. 6 is a diagram illustrating shift operations in a zoom change process. FIG. 6A shows a state of each imaging unit before an operation of control to the wide side. Here, imaging units which are targets for control are the imaging unit 100a and the imaging unit 100b, and the imaging unit 100c remains stationary. The position of the line of intersection between the imaging regions of the imaging unit 100a and the imaging unit 100b calculated in step S303 is defined as a line of intersection 500. In step S307, shift movement is performed so that the line of intersection between the imaging regions is at the same position after operations of control of the imaging unit 100a and the imaging unit 100b to the wide side. In the shift movement of the imaging unit 100a and the imaging unit 100b, since an imaging unit other than a target for control is not located in the vicinity, only the shift movement is performed in order to secure the same position as the line of intersection between the imaging regions. As a result, the positional relationship between the imaging unit 100a and the imaging unit 100b is set as shown in FIG. 6B. In FIG. 6B after the zoom magnification is changed, an angle θ2 between a straight line Y passing through a reference point P and a line of intersection 501 is the same as an angle θ1 between the straight line Y passing through the reference point P and the line of intersection 500 in a state before the zoom magnification is changed (FIG. 6A). In addition, a distance L2 between the reference point P and the line of intersection 501 after the zoom magnification is changed is the same as a distance L1 between the reference point P and the line of intersection 500 before the zoom magnification is changed. That is, the line of intersection 501 between the imaging regions of the imaging units after the wide operation is controlled to be at the same position as the line of intersection 500 before the wide operation.

In step S309, after the shift movement in step S307 or step S308, the imaging device control unit 110 determines whether movement to the same position as the line of intersection between the imaging regions derived in step S303 is possible. In other words, the imaging device control unit 110 determines whether the line of intersection between the imaging regions after the zoom magnification is changed is at the position of the line of intersection between the imaging regions before the zoom magnification is changed. Specifically, the imaging device control unit 110 derives the line of intersection between the imaging regions similarly to the process of step S303. The imaging device control unit 110 compares the line of intersection between the imaging regions derived in step S303 with the present line of intersection between the imaging regions.

In step S309, the imaging device control unit 110 ends the operation of the imaging unit if it is determined that movement to the same position as the line of intersection between the imaging regions derived in step S303 is possible (S309/Yes).

In step S309, the imaging device control unit 110 proceeds to step S310 if movement to the same position as the line of intersection between the imaging regions derived in step S303 is not completed (S309/No).

In step S310, the imaging device control unit 110 performs driving for the imaging unit designated in step S300 in a panning direction (pan direction) with respect to the imaging system control unit 107, and attempts to operate it so as to be at the same position as the line of intersection between the imaging regions derived in S303. If control to the wide side is selected in step S306, the imaging device control unit 110 performs pan driving so that the imaging units are separated from each other with respect to the imaging system control unit 107. In addition, if control to the tele side is selected in step S306, the imaging device control unit 110 performs pan driving so that the imaging units approach each other with respect to the imaging system control unit 107.

Figure 6E:
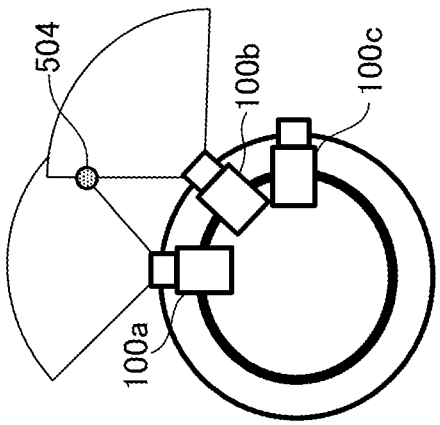
Figure 6D:
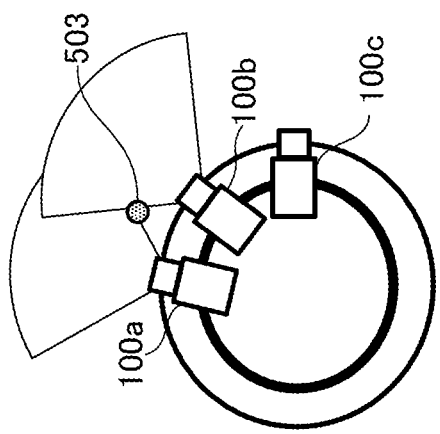
Figure 6C:
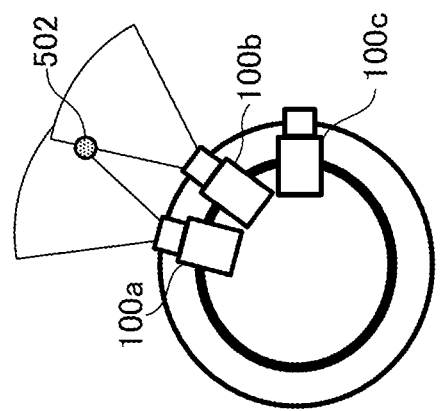

The operations of processes of steps S306 to S310 will be described with reference to FIG. 6. FIG. 6C shows a state of each imaging unit before an operation of control to the wide side. Here, imaging units which are targets for control are the imaging unit 100a and the imaging unit 100b, and the imaging unit 100c remains stationary. The position of the line of intersection between the imaging regions of the imaging unit 100a and the imaging unit 100b calculated in step S303 is defined as a line of intersection 502. In step S307, shift movement to the same position as the line of intersection between the imaging regions is performed after the operations of the imaging unit 100a and the imaging unit 100b to the wide side. However, there is concern of the imaging unit 100b coming into contact with the imaging unit 100c due to the shift movement. In other words, the shift movable range of the imaging unit 100b is insufficient to set the line of intersection between the imaging regions to be at the position of the line of intersection 502 between the imaging regions before the zoom magnification is changed through the shift movement. For this reason, the shift movement is stopped before contact, and the positional relationship between the imaging units is set as shown in FIG. 6D. Meanwhile, in the present specification, the shift movable range of the imaging unit is a range in which the imaging unit is capable of shift movement without contacting an adjacent imaging unit, and the shift movable range of the imaging unit changes in accordance with the position of the adjacent imaging unit. As the imaging unit 100a, the imaging unit 100b, and the imaging unit 100c move on the rail 200, the shift movable range of each imaging unit changes. In FIG. 6D, the position of the line of intersection between the imaging regions after the shift movement of the imaging unit 100a and the imaging unit 100b is defined as a line of intersection 503. Since the line of intersection 502 and the line of intersection 503 do not match and movement to the same position as the line of intersection between the imaging regions is not possible, the process transitions from step S309 to step S310. In step S310, the imaging device control unit 110 performs a pan operation, that is, performs driving for the imaging unit designated in step S300 in a pan direction at a fixed point with respect to the imaging system control unit 107. The positional relationship between the imaging units after the pan operation is set as shown in FIG. 6E. In FIG. 6E, the position of the line of intersection between the imaging regions after the pan operations of the imaging unit 100*a* and the imaging unit 100*b* is defined as a line of intersection 504. That is, the line of intersection 504 between the imaging regions of the imaging units after an operation of control to the wide side is controlled to be at the same position as the line of intersection 502 before the wide operation.

As stated above, according to the present embodiment, the imaging direction and the imaging angle of view between lens barrel units can be uniquely determined, and thus it is possible to easily adjust the imaging ranges of a plurality of lens barrel units. In addition, operations in the imaging direction and at the imaging angle of view between the lens barrel units are interlocked, and thus it is possible to easily adjust the imaging ranges of a plurality of lens barrel units.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The interface may be installed as a program in the information processing device 120. The information processing device 120 includes, for example, a control unit 122. The control unit 122 includes a CPU and a memory, and the CPU executes a computer program loaded from the memory. The control unit 122 causes the display unit 121 to display a user interface screen. The user inputs a desired operation using an input unit such as, for example, a mouse or a touch panel. If the input unit is, for example, a touch panel, the display unit 121 can also function as the input unit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2020-29714, filed Feb. 25, 2020, which is hereby incorporated by reference wherein in its entirety.

What is claimed is:

1. An imaging device comprising:
a first imaging unit for which a zoom magnification is changeable;
a second imaging unit for which a zoom magnification is changeable, wherein the first imaging unit and the second imaging unit are movable on a circumferential guide;
a hardware processor; and
a memory for storing instructions to be executed by the hardware processor, wherein, when the instructions stored in the memory are executed by the hardware processor, the imaging device functions as:
a control unit configured to control the first imaging unit and the second imaging unit; and
wherein the control unit controls the first imaging unit and the second imaging unit so that the first imaging unit and the second imaging unit are separated from each other in a case where the zoom magnification of one of the first imaging unit and the second imaging unit is changed to a wide angle side.

2. The imaging device according to claim 1, wherein the control unit controls the first imaging unit and the second imaging unit so that the first imaging unit and the second imaging unit approach each other in a case where the zoom magnification of one of the first imaging unit and the second imaging unit is changed to a telephoto side.

3. The imaging device according to claim 1, wherein in a case where the zoom magnification of one of the first imaging unit and the second imaging unit is changed, the control unit controls the other one of the first imaging unit or the second imaging unit to have the same zoom magnification as the one of the first imaging unit or the second imaging unit.

4. The imaging device according to claim 1, wherein, the first imaging unit and the second imaging unit are movable in a first direction that is along the circumferential guide, the first imaging unit and the second imaging unit are movable in a second direction that is a pan direction, and the first imaging unit and the second imaging unit are movable in a third direction that is tilt direction.

5. The imaging device according to claim 1, further comprising a third imaging unit arranged next to the first imaging unit; wherein the control unit controls the first imaging unit so that the first imaging unit does not contact the third imaging unit in a case where the first imaging unit moves along the circumferential guide.

6. The imaging device according to claim 1, further comprising a third imaging unit arranged next to the first imaging unit; wherein the control unit controls the first imaging unit so that the first imaging unit does not contact the third imaging unit in a case where the zoom magnification of one of the first imaging unit and the second imaging unit is changed to the wide angle side.

7. The imaging device according to claim 1, wherein, when the instructions stored in the memory are executed by the hardware processor, the imaging device further functions as a receiving unit configured to receive instructions regarding a zoom interlocking operation.

8. The imaging device according to claim 1, wherein, when the instructions stored in the memory are executed by the hardware processor, the imaging device further functions as a receiving unit configured to receive instructions to change the zoom magnification of the first imaging unit and the second imaging unit.

9. A method of controlling an imaging device having a first imaging unit for which a zoom magnification is changeable and a second imaging unit for which a zoom magnification is changeable, wherein the first imaging unit and the second imaging unit are movable on a circumferential guide, the method comprising:
controlling the first imaging unit and the second imaging unit;
wherein the first imaging unit and the second imaging unit are controlled so that the first imaging unit and the second imaging unit separate from each other in a case where the zoom magnification of one of the first imaging unit and the second imaging unit is changed to a wide angle side.

10. A non-transitory computer-readable storage medium having a program stored therein, the program causing a computer to execute a method of controlling an imaging device having a first imaging unit for which a zoom magnification is changeable and a second imaging unit for which a zoom magnification is changeable, wherein the first imaging unit and the second imaging unit are movable on an circumferential guide,
wherein the control method includes:
controlling the first imaging unit and the second imaging unit;
wherein the first imaging unit and the second imaging unit are controlled so that the first imaging unit and the second imaging unit separate from each other in a case where the zoom magnification of one of the first imaging unit and the second imaging unit is changed to a wide angle side.

11. An imaging device comprising:
a first imaging unit for which a zoom magnification is changeable;
a second imaging unit for which a zoom magnification is changeable, wherein the first imaging unit and the second imaging unit are movable on a circumferential guide;
a hardware processor; and
a memory for storing instructions to be executed by the hardware processor, wherein, when the instructions stored in the memory are executed by the hardware processor, the imaging device functions as:
a control unit configured to control the first imaging unit and the second imaging unit; and
wherein the control unit controls the first imaging unit and the second imaging unit so that the first imaging unit and the second imaging unit approach each other in a case where the zoom magnification of one of the first imaging unit and the second imaging unit is changed to a telephoto side.

12. The imaging device according to claim 11, wherein the control unit controls the first imaging unit and the second imaging unit so that the first imaging unit and the second imaging unit are separated from each other in a case where the zoom magnification of one of the first imaging unit and the second imaging unit is changed to a wide angle side.

13. The imaging device according to claim 11, wherein in a case where the zoom magnification of one of the first imaging unit and the second imaging unit is changed, the control unit controls the other one of the first imaging unit or the second imaging unit to have the same zoom magnification as the one of the first imaging unit or the second imaging unit.

14. The imaging device according to claim 11, wherein, the first imaging unit and the second imaging unit are movable in a first direction that is along the circumferential guide, the first imaging unit and the second imaging unit are movable in a second direction that is a pan direction, and the first imaging unit and the second imaging unit are movable in a third direction that is tilt direction.

15. The imaging device according to claim 11, further comprising a third imaging unit arranged next to the first imaging unit; wherein the control unit controls the first imaging unit so that the first imaging unit does not contact the third imaging unit in a case where the first imaging unit moves along the circumferential guide.

16. The imaging device according to claim 11, further comprising a third imaging unit arrange next to the first imaging unit; wherein the control unit control the first imaging unit so that the first imaging unit does not contact with the third imaging unit in a case where the zoom magnification of one of the first imaging unit and the second imaging unit is changed to the wide angle side.

17. The imaging device according to claim 11, wherein, when the instructions stored in the memory are executed by the hardware processor, the imaging device further functions as a receiving unit configured to receive instructions regarding a zoom interlocking operation.

18. The imaging device according to claim 11, wherein, when the instructions stored in the memory are executed by the hardware processor, the imaging device further functions as a receiving unit configured to receive instructions to change the zoom magnification of the first imaging unit and the second imaging unit.

19. A method of controlling an imaging device having a first imaging unit for which a zoom magnification is changeable and a second imaging unit for which a zoom magnification is changeable, wherein the first imaging unit and the second imaging unit are movable on a circumferential guide, the method comprising:
controlling the first imaging unit and the second imaging unit;
wherein the first imaging unit and the second imaging unit are controlled so that the first imaging unit and the second imaging unit approach each other in a case where the zoom magnification of one of the first imaging unit and the second imaging unit is changed to a telephoto side.

20. A non-transitory computer-readable storage medium having a program stored therein, the program causing a computer to execute a method of controlling an imaging device having a first imaging unit for which a zoom magnification is changeable and a second imaging unit for which a zoom magnification is changeable, wherein the first imaging unit and the second imaging unit are movable on a circumferential guide,
wherein the control method includes:
controlling the first imaging unit and the second imaging unit;
wherein the first imaging unit and the second imaging unit are controlled so that the first imaging unit and the second imaging unit approach each other in a case where the zoom magnification of one of the first imaging unit and the second imaging unit is changed to a telephoto side.

\* \* \* \* \*